US009966776B2

(12) United States Patent
Berg et al.

(10) Patent No.: US 9,966,776 B2
(45) Date of Patent: May 8, 2018

(54) DISCHARGE OF BACK-UP CAPACITOR BY CONSTANT CURRENT

(71) Applicant: SIEMENS AKTIENGESELLSCHAFT, München (DE)

(72) Inventors: Wilhelm Berg, Nürnberg (DE); Tobias Pröll, Eckental (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 53 days.

(21) Appl. No.: 15/264,141

(22) Filed: Sep. 13, 2016

(65) Prior Publication Data
US 2017/0077730 A1  Mar. 16, 2017

(30) Foreign Application Priority Data
Sep. 14, 2015  (DE) .......................... 10 2015 217 533

(51) Int. Cl.
*H02J 7/00* (2006.01)
*H02J 7/34* (2006.01)
(52) U.S. Cl.
CPC ............. *H02J 7/0063* (2013.01); *H02J 7/345* (2013.01); *H02J 2007/0067* (2013.01)
(58) Field of Classification Search
CPC ................................... H02J 7/0063
USPC ........................................... 320/166
See application file for complete search history.

(56) References Cited

U.S. PATENT DOCUMENTS

| 3,733,534 A * | 5/1973 | Saslow | H02J 7/0086 320/143 |
| 4,048,551 A * | 9/1977 | Bosik | H02J 7/34 320/140 |
| 4,523,139 A * | 6/1985 | Schwarz | H02J 7/008 320/130 |
| 2006/0279258 A1* | 12/2006 | Jung | H02J 7/025 320/166 |
| 2009/0261788 A1* | 10/2009 | Motoyama | H05B 41/32 320/166 |
| 2014/0176086 A1* | 6/2014 | Crewson | H02M 3/3376 320/166 |

FOREIGN PATENT DOCUMENTS

DE  102013224884 A1  6/2015

* cited by examiner

*Primary Examiner* — Suresh Memula
(74) *Attorney, Agent, or Firm* — Henry M. Feiereisen LLC

(57) ABSTRACT

An electrical arrangement includes a high-voltage battery and a number of electrical utility arrangements connected to the battery via a main switch and a downstream back-up capacitor. A discharge circuit is connected to the capacitor and has a discharge path with an ohmic discharge resistor. In normal mode no current flows in the discharge resistor. Opening the main switch effects a transition from normal mode to special mode, while the discharge path is energized and electrical energy stored in the capacitor is converted into thermal energy by the discharge resistor. The discharge circuit has a voltage converter between the high-voltage side of the capacitor and the discharge path. The voltage converter has a first semiconductor switch for discharging the capacitor clock-controlled such that an electrical output voltage at the discharge path constantly has a rated value so long as a capacitor voltage at the capacitor is above the rated value.

7 Claims, 3 Drawing Sheets

DISCHARGE OF BACK-UP CAPACITOR BY CONSTANT CURRENT

CROSS-REFERENCES TO RELATED APPLICATIONS

This application claims the priority of German Patent Application, Serial No. 10 2015 217 533.2, filed Sep. 14, 2015, pursuant to 35 U.S.C. 119(a)-(d), the disclosure of which is incorporated herein by reference in its entirety as if fully set forth herein.

BACKGROUND OF THE INVENTION

The present invention relates to a discharge of a back-up capacitor by constant current.

The following discussion of related art is provided to assist the reader in understanding the advantages of the invention, and is not to be construed as an admission that this related art is prior art to this invention.

In the case of a high-voltage battery, a backup capacitor which can take up short-term power spikes is generally arranged downstream of the high-voltage battery. In normal mode, the high-voltage battery is connected to utility arrangements via a main switch, such that they are supplied with electrical energy via the high-voltage battery. In the event of a fault, the high-voltage battery is disconnected from the utility arrangements. To ensure voltage tolerance and contact safety, the back-up capacitor has to be discharged as well. The discharge is realized by energizing the discharge path so that the electrical energy stored in the back-up capacitor is converted into thermal energy.

In the art, the back-up capacitor is discharged by connecting the back-up capacitor directly to a discharge resistor. The discharge operation takes place in a relatively short space of time (a few seconds). The current characteristic follows an exponentially falling curve. After the back-up capacitor has been discharged, it is necessary to wait a relatively long time (approx. 1 min) before connecting the high-voltage battery again. Otherwise, when the high-voltage battery has to be disconnected from the utility arrangements again, the resistor would be thermally overloaded. The resistor must be designed both for maximum voltage (usually several 100 V) and for high power spikes. Additionally, it is difficult to dissipate heat generated in the discharge resistor, since connection of the discharge resistor to heat sinks and a housing is permitted only via an electrical insulation.

It would therefore be desirable and advantageous to address these and other prior art shortcomings.

SUMMARY OF THE INVENTION

According to one aspect of the present invention, an electrical arrangement includes a high-voltage battery, a main switch which is closed during normal mode of the electrical arrangement and when opened effects a transition from the normal mode to a special mode, a back-up capacitor disposed downstream of the main switch, a number of electrical utility arrangements connected to the high-voltage battery via the main switch and the back-up capacitor and supplied with electrical energy from the high-voltage battery, when the main switch is closed, and a discharge circuit connected to the back-up capacitor and including an ohmic discharge resistor disposed in a discharge path of the discharge circuit and configured so that in the normal mode no current flows in the discharge resistor, wherein during transition to the special mode the discharge path is energized, so that the electrical energy stored in the back-up capacitor is converted into thermal energy by the discharge resistor, the discharge circuit including a voltage converter having an input side, connected to a high-voltage side of the back-up capacitor, and an output side connected to the discharge path, the voltage converter including a first semiconductor switch configured to discharge the back-up capacitor clock-controlled such that an electrical output voltage at the discharge path constantly has a rated value so long as a capacitor voltage at the backup capacitor is above the rated value.

According to another advantageous feature of the present invention, the voltage converter can be designed as a galvanically non-isolating voltage converter, with the discharge resistor being galvanically connected to the high-voltage side of the back-up capacitor via the voltage converter. This configuration is very simple in terms of circuit engineering and realizes that the resistor no longer needs to be designed for the full voltage of the high-voltage battery and a current determined by the quotient of this voltage with the resistance value of the discharge resistor. Instead, the discharge resistor needs only be designed for the rated value of the output voltage and a current determined by the quotient of the rated value with the resistance value of the discharge resistor. The voltage converter can, for example, be embodied as a step-down converter or as a flyback converter. Other embodiments may also be possible.

According to another advantageous feature of the present invention, the voltage converter can be embodied as a galvanically isolating voltage converter and includes an inductor which is embodied as a transformer, with the discharge resistor being galvanically isolated from the high-voltage side of the back-up capacitor via the transformer. In this way, the resistor is isolated from the high-voltage side of the back-up capacitor, so that the need for an electrical insulation of the resistor, for example from a housing of the electrical arrangement, can be eliminated or at least significantly reduced. As a result, a considerably better thermal coupling of the discharge resistor to a heat sink or to the housing of the electrical arrangement is possible. The voltage converter can, for example, be embodied as a flyback converter, a flux converter, or a Sepic converter. Other embodiments may also be possible.

The afore-described embodiments of the voltage converter correspond in their basic approach to a switched-mode power supply unit generally known per se. This applies for both the galvanically isolating configurations and the galvanically non-isolating configurations.

According to another advantageous feature of the present invention, the discharge path can have a second semiconductor switch which is connected in series to the discharge resistor and has a control input to receive a control signal in both the normal mode and the special mode, with the control signal causing in the normal mode a blocking of the second semiconductor switch, and with the control signal causing in the special mode a current, flowing via the discharge resistor, to have a value which is determined by the control signal. As a result, it is possible for the voltage converter to be operated continuously, i.e. in both the normal mode and the special mode. The current flow in the discharge path is in this case set by the control signal of the second semiconductor switch. This embodiment can, in principle, already be implemented in conjunction with the embodiment of the voltage converter as a galvanically non-isolating voltage converter. Currently preferred, however, is the implementation of this embodiment in conjunction with a configuration of the voltage converter as a galvanically isolating voltage converter.

According to another advantageous feature of the present invention, at least one of the utility arrangements can be supplied with the electrical energy via the voltage converter in the normal mode. This is possible, because in the normal mode a current flow in the discharge path is suppressed by the control signal of the second semiconductor switch. It is thus possible to connect the discharge part in the special mode to a voltage converter which is in any case necessary for operation of the at least one utility arrangement in the normal mode. Connecting the discharge path to the voltage converter is advantageously realized via a switch embodied as an opener, which in the absence of its energy supply closes (at least) one contact and as a result connects the discharge path to the voltage converter.

Generally there is a requirement, during the transition to the special mode, to clear the capacitor voltage present at the back-up capacitor within a predetermined discharge time. It is possible to determine the control signal for the special mode beforehand such that it is reached at all times, regardless of the specific value of the voltage. According to another advantageous feature of the present invention, during opening of the main switch, the capacitor voltage at the back-up capacitor can be captured, and the control signal can be determined for the special mode as a function of the capacitor voltage at the back-up capacitor during opening of the main switch. As a result, the thermal load on the resistor can in particular be reduced in the event that the actual voltage of the high-voltage battery is below the rated voltage thereof.

According to another advantageous feature of the present invention, the utility arrangements can be isolated from the back-up capacitor during transition from the normal mode to the special mode. Still, it may also be possible that during the transition to the special mode the utility arrangements remain connected to the back-up capacitor.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
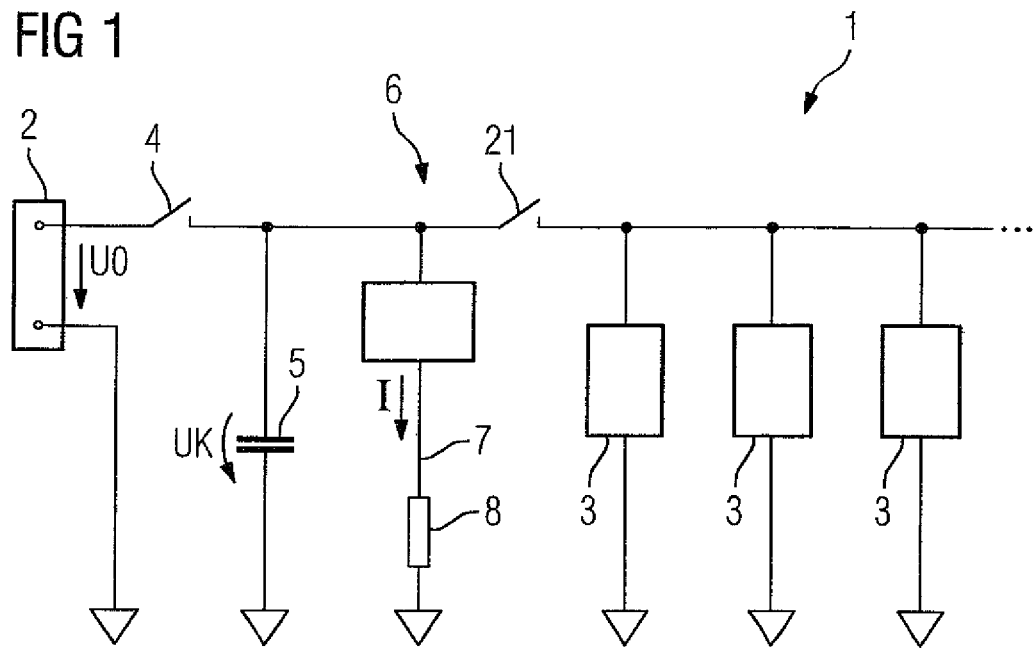
FIG. 1 is a circuit diagram of an electrical arrangement.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a circuit diagram of an electrical arrangement, generally designated by reference numeral 1. The electrical arrangement 1 includes a high-voltage battery 2 and a number of electrical utility arrangements 3. The electrical arrangement 1 can, for example, be an electrical system of an electric car. The high-voltage battery 2 generally has an operating voltage U0 in the range of hundreds of volts, for example up to 500 V. The utility arrangements 3 can for example be converter units, control units for converter units and other consumer units.

The electrical utility arrangements 3 are connected to the high-voltage battery 2 via a main switch 4 and a back-up capacitor 5. The back-up capacitor 5 is downstream of the main switch 4. The main switch 4 therefore optionally isolates not only the utility arrangements 3, but also the back-up capacitor 5 from the high-voltage battery 2. Normally the main switch 4 is closed. As a result, the utility arrangements 3 are supplied with electrical energy as required from the high-voltage battery 2. This operating state is referred to below as the normal mode of the electrical arrangement 1. In certain situations the main switch 4 is opened. This operating state is referred to below as the special mode of the electrical arrangement 1. The special mode can, for example, be assumed when a user of the electrical arrangement 1 requests it via a corresponding input or when a fault occurs within the electrical arrangement 1.

During the transition from normal mode to special mode, the back-up capacitor 5 initially has the present operating voltage U0 of the high-voltage battery 2 as a capacitor voltage UK. The utility arrangements 3 are therefore initially still live. This voltage has to be cleared quickly and reliably for reasons of contact safety. For this purpose, the electrical arrangement 1 has a discharge circuit 6 which is connected to the back-up capacitor 5. The discharge circuit 6 has a discharge path 7 with an ohmic discharge resistor 8.

In normal mode (possibly with the exception of a brief time period at the start of normal mode), no current I flows in the discharge resistor 8. However, when opening the main switch 4 to transition from the normal mode to the special mode, the discharge path 7 is energized. The charge stored on the back-up capacitor 5, which for its part causes the capacitor voltage, is thereby cleared via the discharge resistor 8. The electrical energy stored in the back-up capacitor 5 is thereby converted by the discharge resistor 8 into thermal energy.

Figure 2:
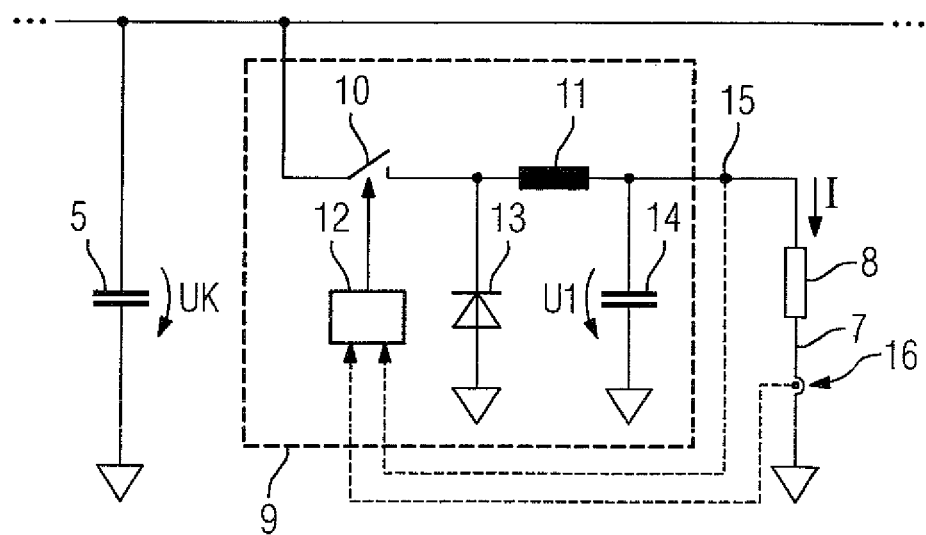
FIG. 2 is a circuit diagram of one embodiment of a discharge circuit of the electrical arrangement.
Figure 3:
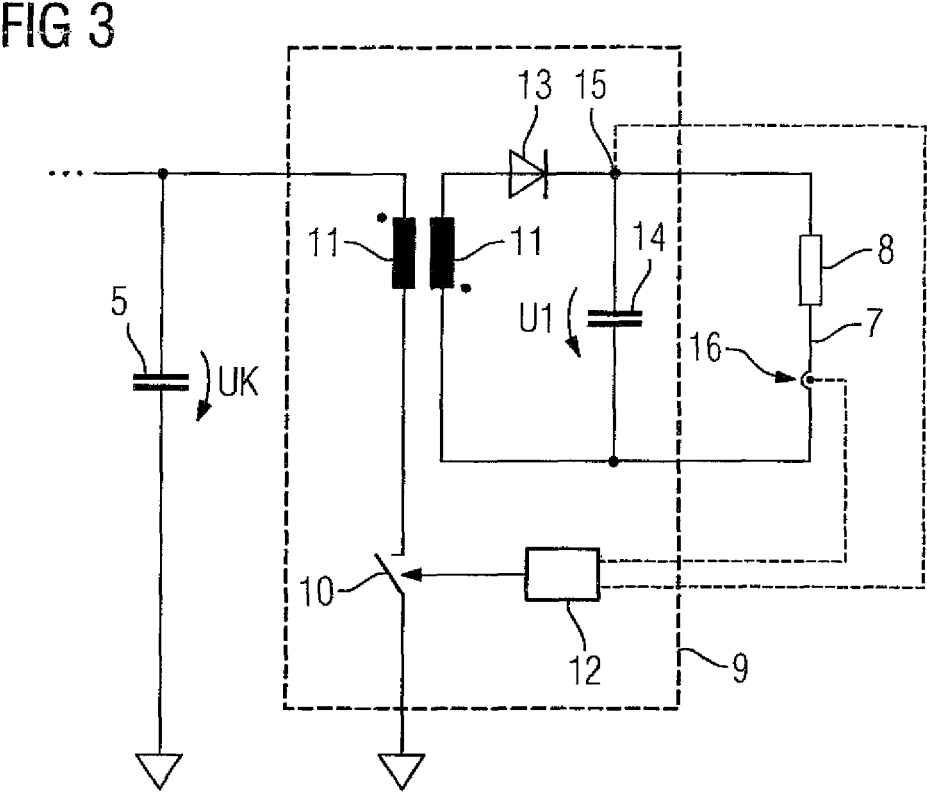
FIG. 3 is a circuit diagram of another embodiment of a discharge circuit of the electrical arrangement.

According to FIGS. 2 and 3 the discharge circuit has a voltage converter 9 in addition to the discharge resistor 8. The voltage converter 9 is connected on the input side to the high-voltage side of the back-up capacitor 5. On the output side, the voltage converter 9 is connected to the discharge path 7. According to the illustration in FIGS. 2 and 3, the voltage converter 9 has a first semiconductor switch 10, a diode 13 and an inductor 11. Generally the voltage converter 9 further has a capacitor 14 on the output side. When the back-up capacitor 5 is to be discharged, the first semiconductor switch 10 is clock-controlled by a control circuit 12 for discharging the back-up capacitor 5. The control circuit 12 is generally a component of the voltage converter 9. Clocking is such that an electrical output voltage U1 of the voltage converter 9 present at the discharge path 7 constantly has a rated value. This applies so long as the capacitor voltage UK present at the back-up capacitor 5 is above the rated value. The amount of the rated value can for example be (relatively) 2-25% of the (rated) operating voltage U0 of the high-voltage battery 2 or (absolutely) 10-120 V.

In the embodiment of the voltage converter 9 according to FIG. 2, the voltage converter 9 is embodied as a galvanically non-isolating voltage converter. The discharge resistor 8 is thus galvanically connected to the high-voltage side of the back-up capacitor 5 via the voltage converter 9.

According to FIG. 2, the voltage converter 9 is embodied as a step-down converter. However, it could alternatively be embodied as a flyback converter. In this case the arrangement of the inductor 11 and the diode 13 would be reversed in respect of the illustration in FIG. 2. Other embodiments are also possible.

FIG. 2 further shows two possible embodiments, by means of which it is possible to ensure that the output voltage U1 of the voltage converter 9 is kept constant. Firstly the output voltage U1 can be captured directly by means of a voltage sensor 15 and can be fed to the control circuit 12. Secondly the current I flowing via the discharge resistor 8 can be captured by means of a current sensor 16 and fed to the control circuit 12. In both cases the control circuit 12 can track the activation of the first semiconductor switch 10—for example on the basis of a pulse width modulation—so that the output voltage U1 is kept at its rated value. These two options can be implemented as alternatives. Hence in FIG. 2 they are both only indicated by a dashed line. The rated value can for example be approx. 40-80 V in the embodiment according to FIG. 2. Other values are, however, also possible.

In the embodiment of the voltage converter 9 according to FIG. 3, the voltage converter 9 is embodied as a galvanically isolating voltage converter. The inductor 11 of the voltage converter 9 is in this case embodied as a transformer. Thanks to the transformer the discharge resistor 8 is thus galvanically isolated from the high-voltage side of the back-up capacitor 5. Also in the embodiment according to FIG. 3, the diode 13 and generally also the capacitor 14 are present. They are hence also included in FIG. 3.

Analogously to the embodiment according to FIG. 2, in the embodiment according to FIG. 3 the output voltage U1 of the voltage converter 9 can be kept constant in that by means of a voltage sensor 15 the output voltage U1 can be captured directly and fed to the control circuit 12. Alternatively the current I flowing via the discharge resistor 8 can be captured by means of a current sensor 16 and fed to the control circuit 12. As in FIG. 2, in both cases the control circuit 12 can track the activation of the first semiconductor switch 10, so that the output voltage U1 is kept at its rated value. Also in FIG. 3, the two options are implemented as alternatives. Hence in FIG. 3 too, they are both only indicated by a dashed line. The amount of the rated value can for example be approx. 12-20 V in the embodiment according to FIG. 3. Other values are, however, also possible. Currently preferred is an amount of the rated value of maximum of 60 V or even less, in particular a maximum of 30 V or less.

The activation of the first semiconductor switch 10 by the control circuit 12 likewise takes place in a galvanically isolated manner in the context of the embodiment of FIG. 3. For example, an optocoupler can be arranged for this purpose between the first semiconductor switch 10 and the control circuit 12. As an alternative or in addition to a galvanically isolated activation of the first semiconductor switch 10, the signal feed from the voltage sensor 15 or from the current sensor 16 to the control circuit 12 can take place in a galvanically isolated manner.

Figure 4:
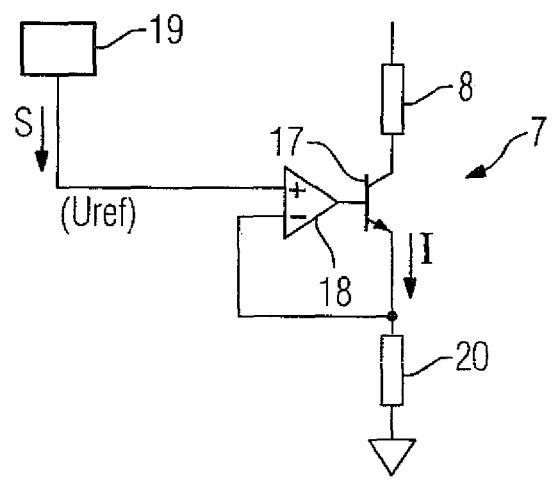
FIG. 4 is a circuit diagram of one embodiment of a discharge path of the electrical arrangement.

In the simplest case the discharge path 7 merely contains the discharge resistor 8 (and of course the associated current-carrying lines). As will be described below in conjunction with FIG. 4, the discharge path 7 has, in addition to the discharge resistor 8, a second semiconductor switch 17 which is connected in series to the discharge resistor 8. The semiconductor switch 17 can for example be embodied as a transistor, in particular as a voltage-controlled transistor (IGBT, MOSFET, etc.). A control signal S is hereby fed to a control input of the second semiconductor switch 17, for example via an operational amplifier 18, by a further control circuit 19. If necessary, a current amplifier can furthermore be arranged downstream of the operational amplifier 18. The control signal S is fed to the control input both in normal mode and in special mode. However, the value of the control signal S in normal mode is different from that in special mode.

In normal mode, the control signal S causes the second semiconductor switch 17 to be blocked. In the case of a voltage-controlled semiconductor switch, the control signal S can, for example, have the value 0 V. In special mode, the control signal S causes the current I flowing via the discharge resistor 8 to have a value determined by the control signal S. For example, in the case of a voltage-controlled semiconductor switch 17 the control signal S can have a particular voltage value Uref. Because a shunt resistor 20 is arranged downstream of the second semiconductor switch 17, the voltage value Uref in conjunction with the resistance value of the shunt resistor 20 determines the current I flowing via the discharge resistor 8.

Figure 5:
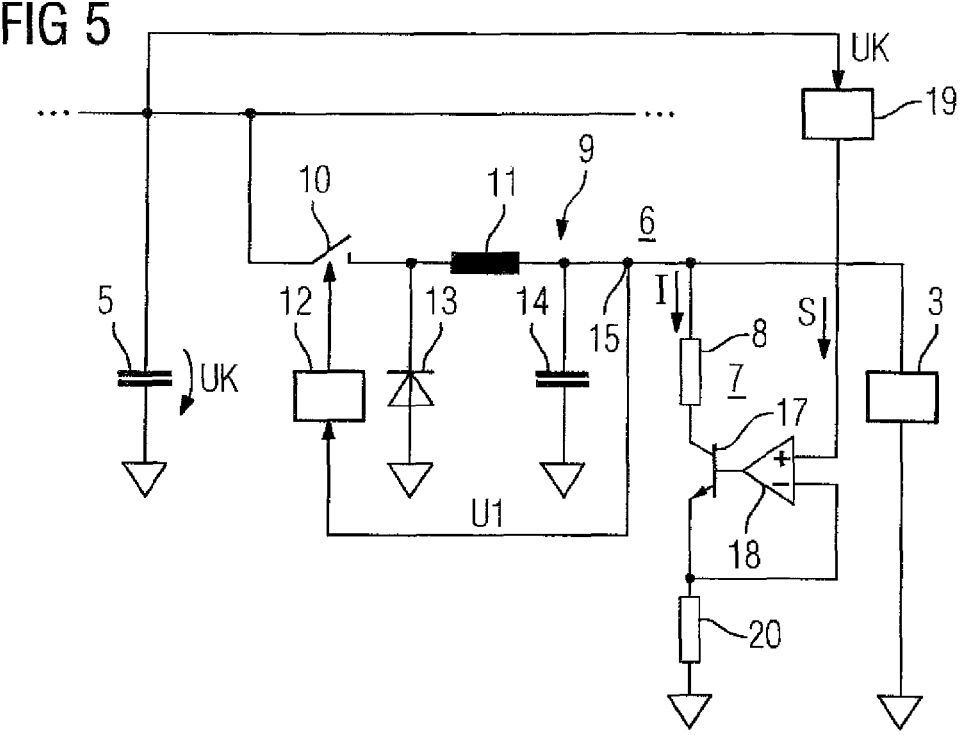
FIG. 5 is a circuit diagram of a modification of the discharge circuit of FIG. 2
Figure 6:
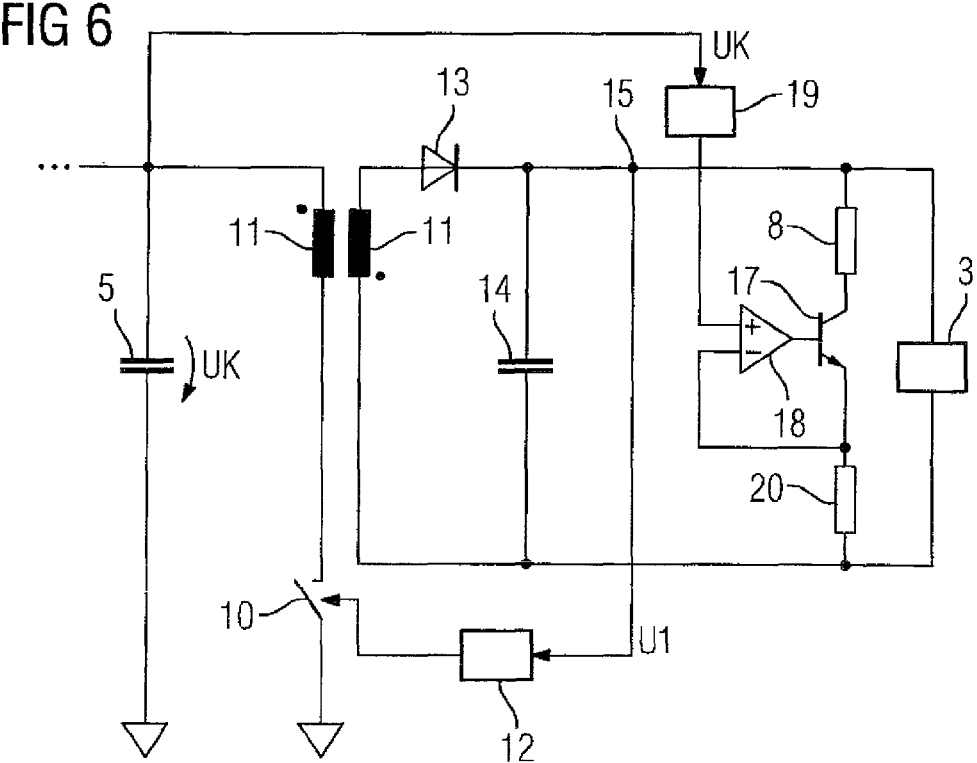
FIG. 6 is a circuit diagram of a modification of the discharge circuit of FIG. 3.

The embodiment of the discharge path 7 explained above in conjunction with FIG. 4 can, according to FIG. 5 in conjunction with an embodiment of the voltage converter 9, be implemented as a galvanically non-isolating voltage converter. However, it can likewise be implemented according to FIG. 6 in conjunction with an embodiment of the voltage converter 9 as a galvanically isolating voltage converter. The embodiment of FIG. 4 has in particular the advantage also illustrated in FIGS. 5 and 6 that in normal mode at least one of the utility arrangements 3 can be supplied with electrical energy via the voltage converter 9. This is the case particularly when this utility arrangement 3 involves a control circuit for a converter unit.

It is possible for the capacitor voltage UK present at the back-up capacitor 5 during opening of the main switch 4 to be captured and fed to the further control circuit 19. In this case the further control circuit 19 can for example determine the value of the reference voltage Uref—and thus the control signal S for special mode—as a function of the capacitor voltage UK present at this time at the back-up capacitor 5.

It is possible that during the transition from normal mode to special mode the utility arrangements 3 remain connected to the back-up capacitor 5. Alternatively it is possible in accordance with the illustration in FIG. 1 for a further switch 21 to be arranged downstream of the discharge circuit 7, by means of which the utility arrangements 3 are isolated from the back-up capacitor 5 during the transition from normal mode to special mode. The switch 21 is not illustrated in FIGS. 5 and 6. However, it can also be present in these embodiments.

Summarizing, the present invention thus concerns the following situation:

An electrical arrangement 1 has a high-voltage battery 2 and a number of electrical utility arrangements 3. The utility arrangements 3 are connected to the high-voltage battery 2 via a main switch 4 and a downstream back-up capacitor 5. In normal mode, the main switch 4 is closed, and the utility arrangements 3 are supplied with electrical energy as required from the high-voltage battery 2. The electrical arrangement 1 has a discharge circuit 6 connected to the back-up capacitor 5, said discharge circuit 6 having a discharge path 7 with an ohmic discharge resistor 8. In normal mode no current I flows in the discharge resistor 8. Opening the main switch 4 brings about a transition from normal mode to special mode. During the transition the discharge path 7 is energized and as a result the electrical energy stored in the back-up capacitor 5 is converted into thermal energy by the discharge resistor 8. The discharge circuit 6 further has a voltage converter 9 between the high-voltage side of the back-up capacitor 5 and the discharge path 7, said voltage converter 9 having a first semiconductor switch 10, a diode 13 and an inductor 11. The first semiconductor switch 10 for discharging the back-up capacitor 5 is clock-controlled such that an electrical output voltage U1 present at the discharge path 7 constantly has a rated value so long as a capacitor voltage UK present at the backup capacitor 5 is above the rated value.

The present invention has many advantages. In particular the thermal output accruing in the discharge resistor 8 is constant over time. Furthermore the discharge resistor 8 need not be designed for the full operating voltage of the high-voltage battery 2. In particular the discharge resistor 8 need only be designed for the output voltage of the voltage converter 9 even for continuous operation. A necessary discharge time can be set selectively as required by the design of the discharge circuit 6. A thermal connection between the discharge resistor 8 and a heat sink or a housing is readily possible. Because of the use of a voltage converter 9 used in any case for the energy supply of at least one utility arrangement 3, no additional components are necessary. By deactivating the voltage converter 9 during an overvoltage and an undervoltage the discharge circuit 6 protects itself.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed is:

1. An electrical arrangement, comprising:
 a high-voltage battery;
 a main switch which is closed during normal mode of the electrical arrangement and when opened effects a transition from the normal mode to a special mode;
 a back-up capacitor disposed downstream of the main switch;
 a number of electrical utility arrangements connected to the high-voltage battery via the main switch and the back-up capacitor and supplied with electrical energy from the high-voltage battery, when the main switch is closed; and
 a discharge circuit connected to the back-up capacitor and including an ohmic discharge resistor disposed in a discharge path of the discharge circuit and configured so that in the normal mode no current flows in the discharge resistor, wherein during transition to the special mode the discharge path is energized, so that the electrical energy stored in the back-up capacitor is converted into thermal energy by the discharge resistor, said discharge circuit including a voltage converter having an input side, connected to a high-voltage side of the back-up capacitor, and an output side connected to the discharge path, said voltage converter including a first semiconductor switch configured to discharge the back-up capacitor clock-controlled such that an electrical output voltage at the discharge path constantly has a rated value so long as a capacitor voltage at the backup capacitor is above the rated value.

2. The electrical arrangement of claim 1, wherein the voltage converter is designed as a galvanically non-isolating voltage converter, said discharge resistor being galvanically connected to the high-voltage side of the back-up capacitor via the voltage converter.

3. The electrical arrangement of claim 1, wherein the voltage converter is embodied as a galvanically isolating voltage converter and includes an inductor which is embodied as a transformer, said discharge resistor being galvanically isolated from the high-voltage side of the back-up capacitor via the transformer.

4. The electrical arrangement of claim 1, wherein the discharge path has a second semiconductor switch which is connected in series to the discharge resistor and has a control input to receive a control signal in both the normal mode and the special mode, with the control signal causing in the normal mode a blocking of the second semiconductor switch, and with the control signal causing in the special mode a current, flowing via the discharge resistor, to have a value which is determined by the control signal.

5. The electrical arrangement of claim 1, wherein at least one of the utility arrangements is supplied with the electrical energy via the voltage converter in the normal mode.

6. The electrical arrangement of claim 4, wherein during opening of the main switch the capacitor voltage at the back-up capacitor is captured, and wherein the control signal is determined for the special mode as a function of the capacitor voltage at the back-up capacitor during opening of the main switch.

7. The electrical arrangement of claim 1, wherein the utility arrangements are isolated from the back-up capacitor during transition from the normal mode to the special mode.

* * * * *